US012050790B2

(12) United States Patent
Rajendrababu (10) Patent No.: US 12,050,790 B2
(45) Date of Patent: Jul. 30, 2024

(54) OPTIMIZING MEMORY FOR REPEATING PATTERNS (71) Applicant: Micron Technology, Inc., Boise, ID (US)

(72) Inventor: Anoop Achuthan Rajendrababu, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/888,919

(22) Filed: Aug. 16, 2022

(65) Prior Publication Data

US 2024/0061595 A1 Feb. 22, 2024

(51) Int. Cl.
*G06F 3/06* (2006.01)

(52) U.S. Cl.
CPC .......... *G06F 3/0629* (2013.01); *G06F 3/0604* (2013.01); *G06F 3/0655* (2013.01); *G06F 3/0679* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20;

(Continued)

(56) References Cited

U.S. PATENT DOCUMENTS 9,386,126 B2 * 7/2016 Callard .................. H04L 69/04
9,514,041 B2 * 12/2016 Takeuchi .............. G06F 3/0614

(Continued)

OTHER PUBLICATIONS

Definition data deduplication; Kranz, Garry et al.; Mar. 2019; retrieved from https://www.techtarget.com/searchstorage/definition/data-deduplication on Oct. 4, 2023 (Year: 2019).*

(Continued)

*Primary Examiner* — Daniel C. Chappell
(74) *Attorney, Agent, or Firm* — Schwegman Lundberg & Woessner, P.A.

(57) ABSTRACT

Aspects of the present disclosure configure a memory subsystem processor to manage memory operations with repeating data patterns. The processor receives a request to write a block of data comprising a plurality of portions to a set of memory components and determines whether a pattern of data repeats across the plurality of portions of the block of data. In response to determining that the pattern of data repeats across the plurality of portions, the processor stores a representation of the pattern of data in a mapping table and discards the block of data to prevent storing the block of data on the set of memory components.

20 Claims, 5 Drawing Sheets (58) Field of Classification Search
CPC ........ G06N 99/00–007; G06F 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75
See application file for complete search history.

(56) References Cited

U.S. PATENT DOCUMENTS

| | | | | |
|---|---|---|---|---|
| 9,852,025 | B2* | 12/2017 | Li | G06F 11/108 |
| 10,579,267 | B2* | 3/2020 | Takeuchi | G06F 3/0688 |
| 11,593,218 | B1* | 2/2023 | Mathew | G06F 16/152 |
| 11,593,332 | B1* | 2/2023 | Shilane | G06F 16/2255 |
| 11,644,992 | B2* | 5/2023 | Cho | G06F 3/0641 707/692 |
| 2013/0159255 | A1* | 6/2013 | Kaga | G06F 11/1458 707/640 |
| 2015/0124683 | A1* | 5/2015 | Stjernholm | H04L 69/04 370/312 |
| 2015/0172891 | A1* | 6/2015 | Persson | H04L 69/04 370/236 |
| 2015/0319268 | A1* | 11/2015 | Callard | H04L 67/10 709/231 |
| 2016/0156531 | A1* | 6/2016 | Cartwright | H04L 43/062 455/423 |
| 2018/0121454 | A1* | 5/2018 | Kushwah | H04L 67/568 |
| 2021/0034292 | A1* | 2/2021 | Vankamamidi | G06F 3/0604 |
| 2021/0064236 | A1* | 3/2021 | Tamilarasan | G06F 3/0673 |
| 2023/0133361 | A1* | 5/2023 | Shilane | G06F 16/2246 707/664 |

OTHER PUBLICATIONS

F. M. Chache et al., "Effects of Lossy Compression on the Age of Information in a Low Power Network," 2023 IEEE 24th International Symposium on a World of Wireless, Mobile and Multimedia Networks (WoWMoM), Boston, MA, USA, 2023, pp. 382-387, doi: 10.1109/WoWMoM57956.2023.00068 (Year: 2023).*

* cited by examiner

| LOGICAL ADDRESS ⌐310 | PHYSICAL ADDRESS ⌐320 |
|---|---|
| 1 | 0xFFFFFE000 ⌐330 |
| 2 ⌐343 | 0xFFFFFE002 |
| 3 | 0x[FFFFFE0000] ⌐341 ⌐342 ⌐340 |
| 4 | 0xFFFFFE0000 |

OPTIMIZING MEMORY FOR REPEATING PATTERNS

TECHNICAL FIELD

Embodiments of the disclosure relate generally to memory sub-systems and, more specifically, to managing write and read operations on memory sub-systems.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data on the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure configure a system component, such as a memory sub-system processor or controller, to prevent writing data to the media or memory components if data corresponds to a repeating pattern. Rather than consuming space on the media or memory components, the memory sub-system processor or controller stores a pattern marker that represents the repeating pattern and can be used to read the data in subsequent operations. This increases memory capacity and performance of memory operations. This improves the overall efficiency of operating and implementing the memory sub-system.

A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices (e.g., memory dies) that store data. The host system can send access requests (e.g., write command, read command) to the memory sub-system, such as to store data at the memory sub-system and to read data from the memory sub-system. The data (or set of data) specified by the host is hereinafter referred to as "host data," "application data," or "user data."

The memory sub-system can initiate media management operations, such as a write operation, on host data that is stored on a memory device. For example, firmware of the memory sub-system may rewrite previously written host data from a location on a memory device to a new location as part of garbage collection management operations. The data that is rewritten, for example as initiated by the firmware, is hereinafter referred to as "garbage collection data." "User data" can include host data and garbage collection data. "System data" hereinafter refers to data that is created and/or maintained by the memory sub-system for performing operations in response to host requests and for media management. Examples of system data include, and are not limited to, system tables (e.g., logical-to-physical address mapping table), data from logging, scratch pad data, etc.

Many different media management operations can be performed on the memory device. For example, the media management operations can include different scan rates, different scan frequencies, different wear leveling, different read disturb management, different near miss error correction (ECC), and/or different dynamic data refresh. Wear leveling ensures that all blocks in a memory component approach their defined erase-cycle budget at the same time, rather than some blocks approaching it earlier. Read disturb management counts all of the read operations to the memory component. If a certain threshold is reached, the surrounding regions are refreshed. Near-miss ECC refreshes all data read by the application that exceeds a configured threshold of errors. Dynamic data-refresh scan reads all data and identifies the error status of all blocks as a background operation. If a certain threshold of errors per block or ECC unit is exceeded in this scan-read, a refresh operation is triggered. Memory operations can also include erase operations, such as erase suspend/resume operations.

A memory device can be a non-volatile memory device. A non-volatile memory device is a package of one or more dice (or dies). Each die can be comprised of one or more planes. For some types of non-volatile memory devices (e.g., negative-and (NAND) devices), each plane is comprised of a set of physical blocks. For some memory devices, blocks are the smallest area than can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which are raw memory devices combined with a local embedded controller for memory management within the same memory device package.

There are challenges in efficiently managing or performing media management operations on typical memory devices. Specifically, there are challenges to efficiently consuming storage capacity or space of the memory devices. For example, storage capacity or space in the memory devices is wasted on repeating data patterns. For example, when an image or photograph is stored, data representing a background of the image can be repetitive as there can exist minimal or no changes from one portion (e.g., pixel) of the image to another. Typical memory devices receive requests to store such repeating data and store the repeating data on the memory devices. Specifically, a block of data can be received, such as a page of data, in which every byte within the page of data includes all '0' or all '1' values. The amount of storage media needed to store such a repeating pattern of data is the same as the size of the page. Typical memory devices store the received data completely without attempting to identify or determine repeating patterns. This can result in wasted storage space and inefficient use of the memory devices. Reading such data in the same way as other data can result in wasteful and inefficient memory read operations.

Aspects of the present disclosure address the above and other deficiencies by providing a memory controller that prevents writing data to the media or memory components if the data corresponds to a repeating pattern. In some examples, rather than consuming storage space on the media or memory components, the memory controller stores a pattern marker that represents the repeating pattern and can be used to read the data in subsequent operations. This increases the efficiency of operating memory systems by allowing repeating data storage requests to be serviced differently and processed in an efficient manner relative to other storage requests. By not applying a one-size-fits-all approach to memory storage operations relating to repeating data patterns, the efficiency and storage capacity of the memory devices is improved.

In some examples, the memory controller (firmware) receives a request to write a block of data including a plurality of portions to the set of memory components. The memory controller determines whether a pattern of data repeats across the plurality of portions of the block of data. In response to determining that the pattern of data repeats across the plurality of portions, the memory controller can store a representation of the pattern of data in a mapping table and discard the block of data to prevent storing the block of data on the set of memory components. In some cases, the block of data includes a page of data and each portion of the plurality of portions corresponds to a byte of data. The mapping table can include a page map.

In some examples, the memory controller can compare an individual portion of the plurality of portions to each of a remainder (or remaining set) of the plurality of portions. The memory controller determines that the pattern of data repeats across the plurality of portions of the block of data in response to determining that the individual portion matches each of the remainder of the plurality of portions. In such cases, the memory controller generates an invalid physical address corresponding to the set of memory components in response to determining that the pattern of data repeats across the plurality of portions. A portion of the invalid physical address includes the pattern of the data. A size of the portion of the invalid physical address can correspond to or match a size of an individual portion of the plurality of portions.

In some examples, a total quantity of bits included in the invalid physical address exceeds an address range of the set of memory components of the memory sub-system. The memory controller, in response to determining that the pattern of data fails to repeat across the plurality of portions, can store the block of data to the set of memory components.

In some examples, the memory controller can identify a range of valid storage addresses corresponding to the set of memory components. The memory controller increments (e.g., adds one to) the range of valid storage addresses. The memory controller can combine (e.g., compute a sum of) the incremented range of valid storage addresses with the pattern of data that repeats across the plurality of portions of the block of data to generate a pattern marker. The memory controller stores the pattern marker as the representation of the pattern of data in the mapping table. In some examples, the memory controller can associate multiple entries in the mapping table each corresponding to a different logical address with a same representation of the pattern of data.

In some examples, the memory controller identifies a logical address associated with the received request and associates the logical address with the pattern marker in the mapping table. The memory controller receives, from a host, a request to read data from a logical address. In response to receiving the request to read the data, the memory controller obtains the pattern marker from the mapping table associated with the logical address. The memory controller determines that the pattern marker corresponds to an invalid address range and, in response, the memory controller extracts the pattern of data from the pattern marker.

In some examples, the memory controller generates a read block of data that includes a plurality of read portions each including the pattern of data extracted from the pattern marker. The memory controller provides the read block of data to the host. The request to read data can be completed or serviced without reading information from (e.g., without accessing) the set of memory components. The memory controller can subtract the incremented range of valid storage addresses from the pattern marker to extract the pattern of data.

Though various embodiments are described herein as being implemented with respect to a memory sub-system (e.g., a controller of the memory sub-system or media controller of individual memory dies), some or all of the portions of an embodiment can be implemented with respect to a host system, such as a software application or an operating system of the host system.

Figure 1:
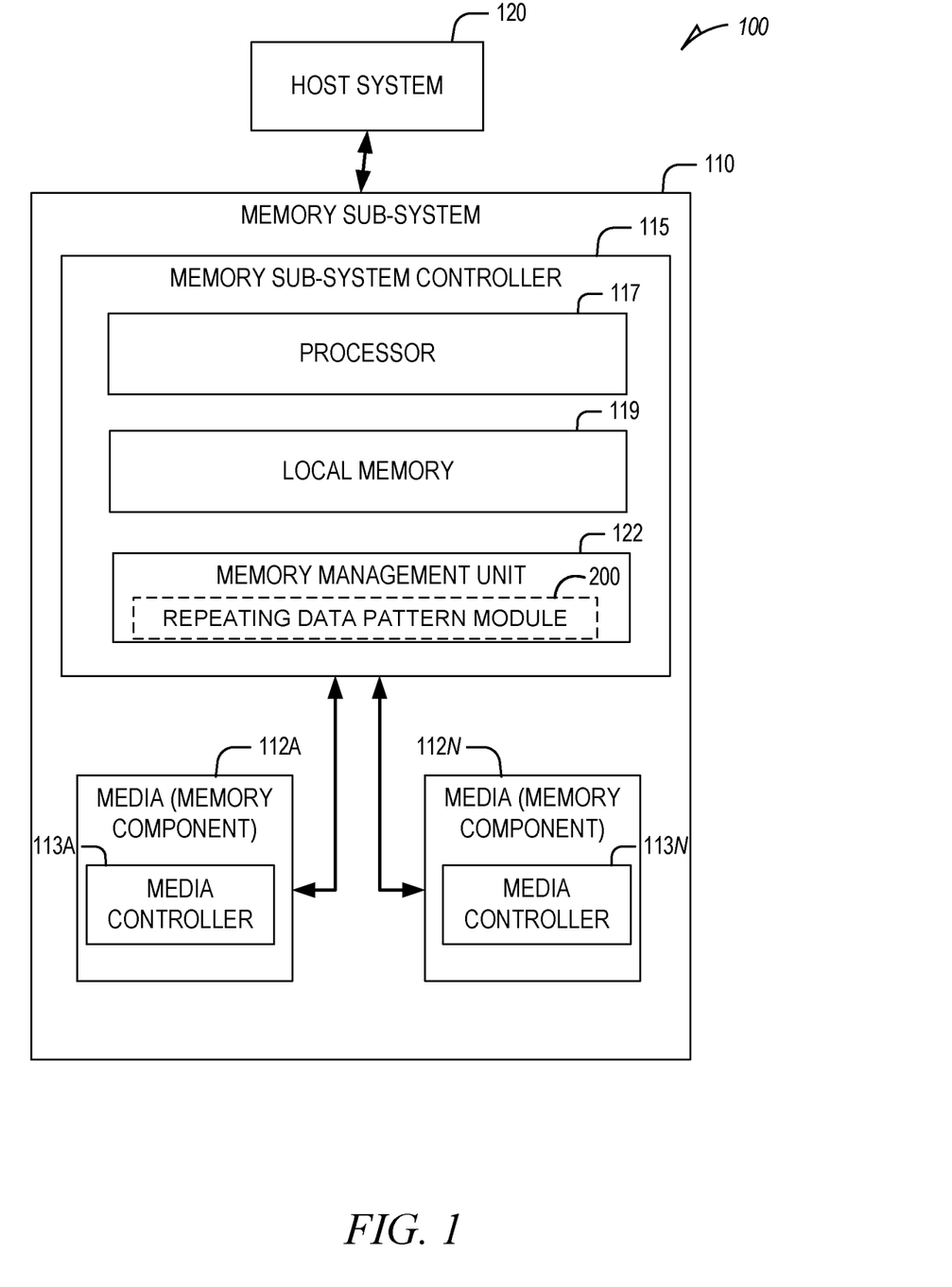
FIG. 1 is a block diagram illustrating an example computing environment including a memory sub-system, in accordance with some embodiments of the present disclosure.

FIG. 1 illustrates an example computing environment 100 including a memory sub-system 110, in accordance with some examples of the present disclosure. The memory sub-system 110 can include media, such as memory components 112A to 112N (also hereinafter referred to as "memory devices"). The memory components 112A to 112N can be volatile memory devices, non-volatile memory devices, or a combination of such. The memory components 112A to 112N can be implemented by individual memory dies, such that a first memory component 112A can be implemented by a first memory die (or a first collection of memory dies) and a second memory component 112N can be implemented by a second memory die (or a second collection of memory dies).

In some embodiments, the memory sub-system 110 is a storage system. A memory sub-system 110 can be a storage device, a memory module, or a hybrid of a storage device and memory module. Examples of a storage device include a SSD, a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 (e.g., a host) that is coupled to a memory system. The memory system can include one or more memory sub-systems 110. In some embodiments, the host system 120 is coupled to different types of memory sub-systems 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, and so forth.

The host system 120 can be a computing device such as a desktop computer, laptop computer, network server, a mobile device, a camera, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a USB interface, a Fibre Channel interface, a Serial Attached SCSI (SAS) interface, and so forth. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120. The memory sub-system 110 can be implemented on a printed circuit board (PCB) that is coupled to the host system 120.

The memory components 112A to 112N can include any combination of the different types of non-volatile memory components and/or volatile memory components. An example of non-volatile memory components includes a NAND-type flash memory. Each of the memory components 112A to 112N can include one or more arrays of memory cells such as single-level cells (SLCs) or multi-level cells (MLCs) (e.g., tri-level cells (TLCs) or quad-level cells (QLCs)). In some embodiments, a particular one of the memory components 112A to 112N can include both an SLC portion and an MLC portion of memory cells. Each of the memory cells can store one or more bits of data (e.g., blocks) used by the host system 120. Although non-volatile memory components such as NAND-type flash memory are described, the memory components 112A to 112N can be based on any other type of memory, such as a volatile memory. In some embodiments, the memory components 112A to 112N can be, but are not limited to, random access memory (RAM), read-only memory (ROM), dynamic random-access memory (DRAM), synchronous dynamic random access memory (SDRAM), phase change memory (PCM), magnetoresistive random access memory (MRAM), negative-or (NOR) flash memory, electrically erasable programmable read-only memory (EEPROM), and a cross-point array of non-volatile memory cells.

A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, the memory cells of the memory components 112A to 112N can be grouped as memory pages, slices, or blocks that can refer to a unit of the memory component 112 used to store data. In some examples, a memory page includes or represents 4 k individual byte portions.

A memory sub-system controller 115 can communicate with the memory components 112A to 112N to perform memory operations such as reading data, writing data, or erasing data at the memory components 112A to 112N and other such operations. The memory sub-system controller 115 can communicate with the memory components 112A to 112N to perform various memory management operations, such as different scan rates, different scan frequencies, different wear leveling, different read disturb management, different near miss ECC operations, and/or different dynamic data refresh.

The memory sub-system controller 115 can include hardware such as one or more integrated circuits and/or discrete components, a memory management unit 122, a buffer memory, and/or a combination thereof. The memory sub-system controller 115 can be a microcontroller, special-purpose logic circuitry (e.g., a field programmable gate array (FPGA), an application specific integrated circuit (ASIC), etc.), or another suitable processor. The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and so forth. The local memory 119 can also include ROM for storing microcode with instructions for the memory sub-system controller 115 to execute, such as firmware. While the example memory sub-system 110 in FIG. 1 has been illustrated as including the memory sub-system controller 115, in another embodiment of the present disclosure, a memory sub-system 110 may not include a memory sub-system controller 115, and can instead rely upon external control (e.g., provided by an external host, or by a processor 117 or controller separate from the memory sub-system 110).

In general, the memory sub-system controller 115 can receive commands or operations from the host system 120 and can convert the commands or operations into instructions or appropriate commands to achieve the desired access to the memory components 112A to 112N. The memory sub-system controller 115 can be responsible for other memory management operations, such as wear leveling operations, garbage collection operations, error detection and ECC operations, encryption operations, caching operations, memory components 112A to 112N initialization, and/or address translations using the memory management unit 122. The memory sub-system controller 115 can further include host interface circuitry to communicate with the host system 120 via the physical host interface. The host interface circuitry can convert the commands received from the host system 120 into command instructions to access the memory components 112A to 112N as well as convert responses associated with the memory components 112A to 112N into information for the host system 120. The memory sub-system controller 115 can include a memory interface to communicate with the memory components 112A to 112N. Any component included as part of the memory sub-system controller 115 can be included in the memory interface and vice versa. Any components shown and described in connection with the memory sub-system controller 115 can be implemented by software, hardware, and/or both software and hardware.

The memory sub-system 110 can also include additional circuitry or components that are not illustrated. In some embodiments, the memory sub-system 110 can include a cache or buffer (e.g., DRAM or other temporary storage location or device) and address circuitry (e.g., a row decoder and a column decoder) that can receive an address from the memory sub-system controller 115 and decode the address to access the memory components 112A to 112N.

The memory devices can be raw memory devices (e.g., NAND), which are managed externally, for example, by an external controller (e.g., memory sub-system controller 115, such as the memory management unit 122). The memory devices can be managed memory devices (e.g., managed NAND), which are raw memory devices combined with a local embedded controller (e.g., local media controllers) for memory management within the same memory device package. Any one of the memory components 112A to 112N can include a media controller (e.g., media controller 113A and media controller 113N) to manage the memory cells of the memory component (e.g., to perform one or more memory management operations), to communicate with the memory sub-system controller 115, and to execute memory requests (e.g., read or write) received from the memory sub-system controller 115.

Figure 2:
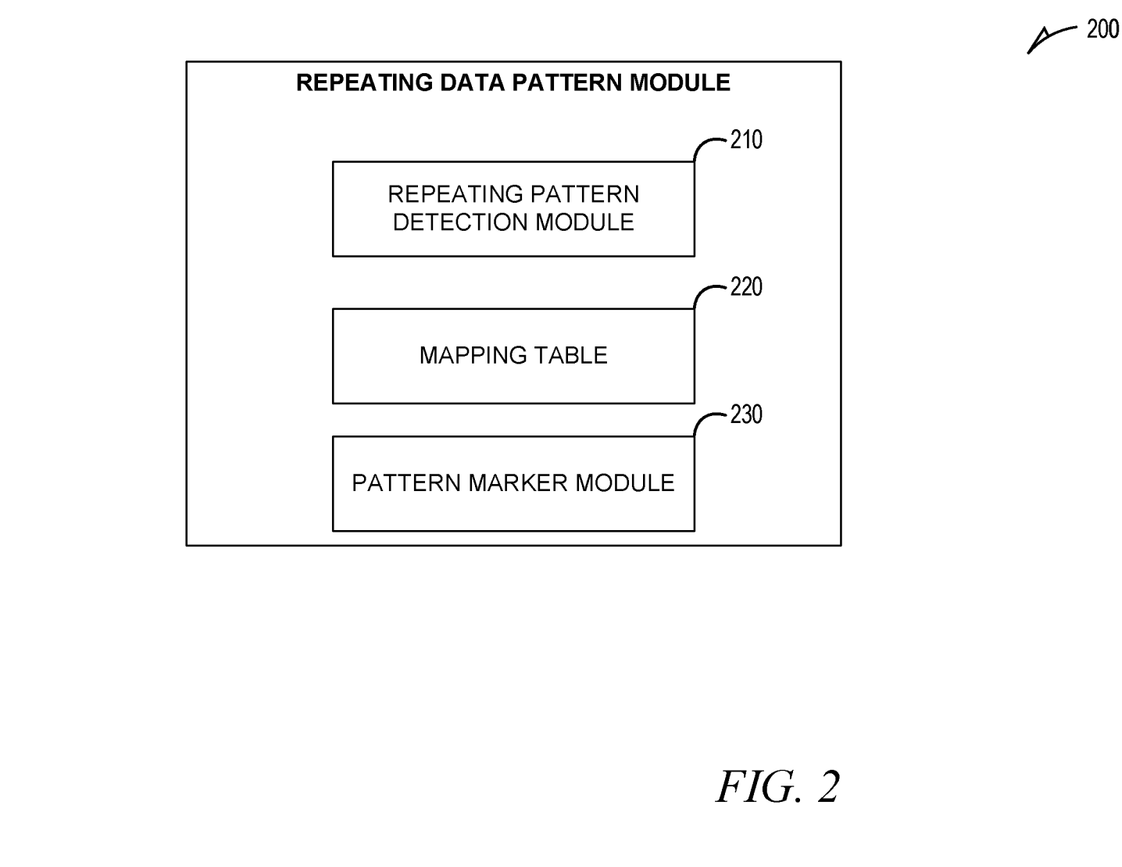
FIG. 2 is a diagram of an example repeating data pattern module, in accordance with some implementations of the present disclosure.

In some examples, the memory management unit 122 can include or have access to a repeating data pattern module 200. The repeating data pattern module 200 controls preventing or avoiding writing data to the memory components 112A to 112N if the data corresponds to a repeating pattern. In some examples, rather than consuming storage space on the media or memory components, the repeating data pattern module 200 stores a pattern marker that represents the repeating pattern in the local memory 119 and/or in a mapping table maintained by the repeating data pattern module 200. This marker can be used to service a request to read repeating data without accessing or retrieving any data from the memory components 112A to 112N in subsequent operations. This increases the efficiency of operating memory systems by allowing repeating data storage requests to be serviced differently and processed in an efficient manner relative to other storage requests. By not applying a one-size-fits-all approach to memory storage operations relating to repeating data patterns, the efficiency and storage capacity of the memory devices is improved.

Depending on the embodiment, the memory management unit 122 can comprise logic (e.g., a set of transitory or non-transitory machine instructions, such as firmware) or one or more components that causes the memory management unit 122 to perform operations described herein. The memory management unit 122 can comprise a tangible or non-tangible unit capable of performing operations described herein.

FIG. 2 is a diagram of an example repeating data pattern module 200 of the memory sub-system 110, in accordance with some implementations of the present disclosure. The repeating data pattern module 200 includes a repeating pattern detection module 210, a mapping table 220, and a pattern marker module 230. The repeating data pattern module 200 can receive a request from the host system 120 to write data to the memory components 112A to 112N. The data can include a block of data that includes a plurality of portions (e.g., 4 k portions). For example, the block can be a page of data that includes a plurality of bytes. In some cases, the request can be received via the processor 117 and/or the memory management unit 122.

The repeating data pattern module 200 processes the block of data by the repeating pattern detection module 210. The repeating pattern detection module 210 can determine whether the block of received data corresponds to a repeating pattern of data. For example, the repeating pattern detection module 210 can be implemented in software or hardware and can be configured to compare each portion of the block with each other to determine whether the portions include identical data. Specifically, the repeating pattern detection module 210 can retrieve a first portion from the block of data. The repeating pattern detection module 210 can compare the first portion of the block of data to a second portion of the block of data. In response to determining that the first portion matches the second portion (e.g., an XOR operation between the first and second blocks results in all '0' values), the repeating pattern detection module 210 determines that the first portion matches the second portion.

The repeating pattern detection module 210 can then perform a similar comparison between the first portion (or second portion) with a third portion of the block of data. In response to determining that the first portion matches the third portion (e.g., an XOR operation between the first and second blocks results in all '0' values), the repeating pattern detection module 210 determines that the first portion matches the third portion. The repeating pattern detection module 210 continues comparing the first portion to each of the remaining portions of the block (e.g., the 3999 remaining portions in a block that includes 4000 portions). In response to determining that the first portion matches each of the remaining portions of the block (e.g., all of the portions of the block are the same), the repeating pattern detection module 210 determines that the block includes a repeating data pattern.

In such cases, the repeating pattern detection module 210 communicates with the pattern marker module 230 to store a representation of the repeating pattern of data instead of storing the data received in the request from the host system 120 to the memory components 112A to 112N. In some examples, the repeating pattern detection module 210 provides one of the portions of the block to the pattern marker module 230. The pattern marker module 230 can generate a pattern marker based on or using the portion of the block received from the repeating pattern detection module 210. In response to determining that at least one of the portions fails to match any of the other portions of the block of data, the pattern marker module 230 communicates with the memory management unit 122 and the mapping table 220 to store the block of data to the memory components 112A to 112N.

The pattern marker module 230 accesses configuration information associated with the memory sub-system 110 to identify a range of valid physical addresses of the memory components 112A to 112N. The range of valid physical addresses of the memory components 112A to 112N represents the entire addressable memory space of the memory components 112A to 112N. For example, the valid physical address range can be represented by 40 bits. This means that data can be stored in the memory components 112A to 112N to any address that can be represented by the 40 bits of the valid physical address range.

In some examples, based on the valid physical address range, the pattern marker module 230 can identify an invalid address range to generate a pattern marker. The pattern marker can represent repeating data up to the size of the portion of the block of data. For example, the portion of the block of data can be one byte (8 bits), in which case the pattern marker can be generated to represent any repeating byte pattern. Other sizes of portions can be similarly represented by the pattern marker, such as a nimble, kilobyte, megabyte, and so forth. The pattern marker module 230 increments the invalid address range by a singular value of '1', such as by adding a bit to the valid physical address range. Namely, the invalid address range can include 41 bits or 44 bits in which a certain portion of the invalid address range represents the repeating pattern of data and a remaining portion corresponds to a unique identifier of the pattern of data. To generate the pattern marker, the pattern marker module 230 obtains the start of the invalid address range (which can be the end of the valid address range incremented by one) and combines that starting address (e.g., computes a sum of the starting address) with the portion of the block of the data received from the repeating pattern detection module 210.

For example, the portion of the block of data can correspond to an individual value (e.g., the value nine) within a possible set of 256 values (corresponding to one byte of data). The value nine can be represented by the byte "0000 1001" (0x9). The pattern marker module 230 determines that the starting address of the invalid address range is 0xFFFFFE0000. In such cases, the pattern marker module 230 generates the pattern marker by combining the starting address of the invalid address range (0xFFFFFE0000) with the value nine (0x9). Namely, the pattern marker can be 0xFFFFFE0009. The last eight bits represent the repeating pattern and the other bits represent a unique identifier of the repeating pattern.

Figure 3:
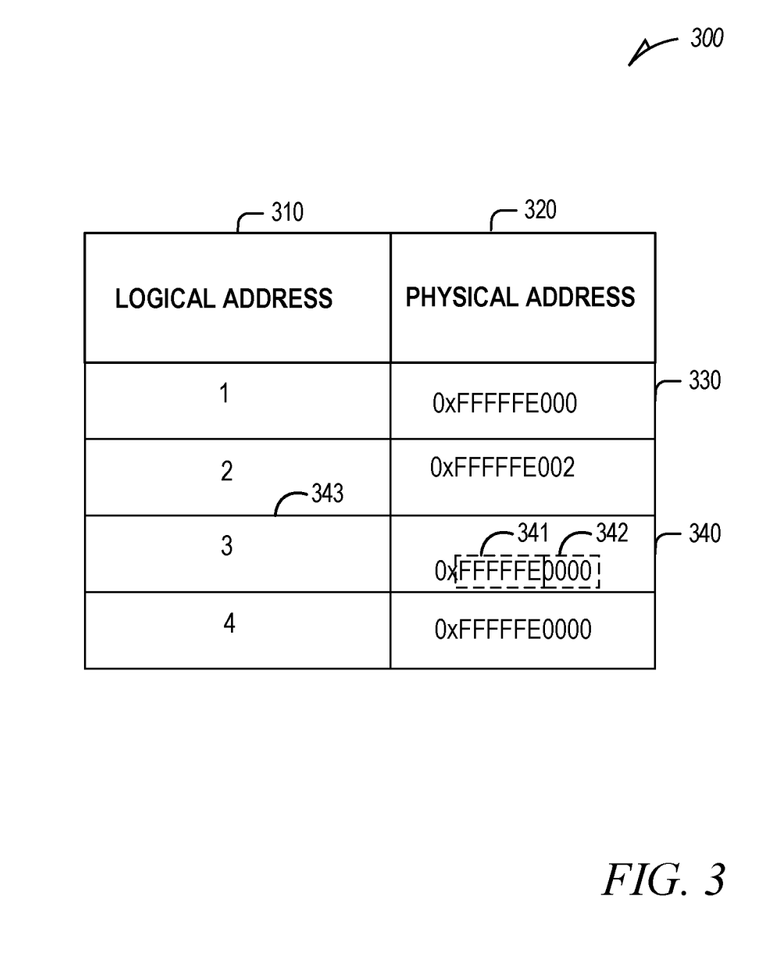
FIG. 3 is an example mapping table, in accordance with some implementations of the present disclosure.

The pattern marker module 230 provides the pattern marker to the mapping table 220. The mapping table 220, which can be a page map, stores the pattern marker in association with an individual logical address received in the request from the host system 120 to store the block of data. FIG. 3 is an example mapping table 300 (corresponding to the mapping table 220) of the repeating data pattern module 200, in accordance with some implementations of the present disclosure. Specifically, the mapping table 300 stores associations between logical addresses 310 and physical addresses 320. The physical addresses can be within a valid range of addresses of the memory components 112A to 112N or in the invalid range of addresses.

The mapping table 300 obtains the logical address from the request received from the host system 120 associated with the block of data determined to be repeating. The mapping table 300 stores the local address 343 in the list of logical addresses 310 in association with the pattern maker 340 stored in the list of physical addresses 320. In some examples, the mapping table 300 can store an association between a logical address and a valid physical address 330. The mapping table 300 is used by the memory management unit 122 to retrieve data from the memory components 112A to 112N from a physical address corresponding to a logical address received from the host system 120.

For example, the memory management unit 122 can receive a request from the host system 120 to read an individual logical address. In response, the memory management unit 122 searches the mapping table 300 to identify a physical address that is associated with the individual logical address that is requested to be read. The memory management unit 122 can determine that the identified physical address is in the valid range of physical addresses, such as by accessing configuration information associated with the memory sub-system 110. In such cases, the memory management unit 122 communicates with the memory components 112A to 112N to retrieve the data from the corresponding physical address and to return the retrieved or read data back to the host system 120.

In some examples, the memory management unit 122 can receive from the mapping table 300 a physical address that is associated with an individual logical address. The memory management unit 122 can determine that the physical address is in the invalid range of physical addresses, such as by accessing configuration information associated with the memory sub-system 110. In such cases, the memory management unit 122 determines that the physical address received from the mapping table 300 represents a pattern marker for repeating data. The pattern marker can include a unique identifier portion 341 and a repeating data portion 342. In such cases, the memory management unit 122 generates a read data block using the repeating data portion 342 of the physical address obtained from the mapping table 300 instead of communicating with the memory components 112A to 112N to retrieve data from storage.

In an example, the memory management unit 122 obtains or extracts the repeating data portion 342 of the pattern marker corresponding to the repeating pattern. To do so, the memory management unit 122 subtracts the pattern marker from the range of valid physical addresses incremented by one. The memory management unit 122 generates a read data block by appending or combining a plurality of instances or portions of the extracted repeating data portion 342. The quantity in the plurality of instances corresponds to a size of the block of data requested by the host system 120. For example, if the block corresponds to a page of data that includes 4 k blocks, the memory management unit 122 repeats the repeating pattern 4 k times to form the read block of data. The memory management unit 122 returns the generated block of data to the host system 120 to service or satisfy or response to the request received from the host system 120 to read the individual logical address.

Figure 4:
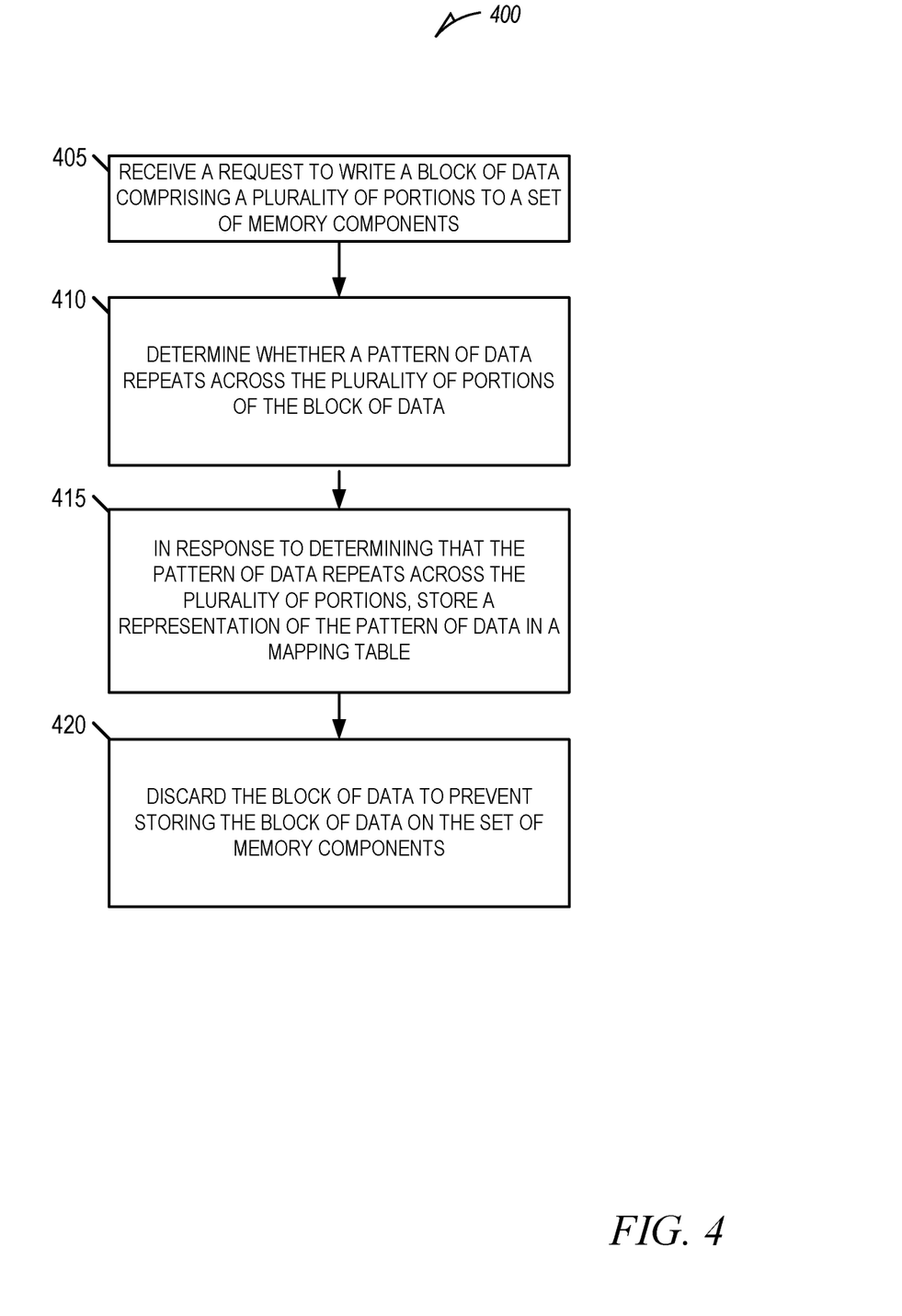
FIG. 4 is a flow diagram of an example method to perform repeating data pattern operations management, in accordance with some implementations of the present disclosure.

FIG. 4 is a flow diagram of an example method 400 to perform repeating data pattern operations management, in accordance with some implementations of the present disclosure. The method 400 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 400 is performed by the memory management unit 122 and/or the repeating data pattern module 200 of FIGS. 1 and 2. Although the processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Referring now FIG. 4, the method (or process) 400 begins at operation 405, with a memory management unit 122 of a memory sub-system (e.g., memory sub-system 110) receiving a request to write a block of data comprising a plurality of portions to the set of memory components. Then, at operation 410, the memory management unit 122 determines whether a pattern of data repeats across the plurality of portions of the block of data. The memory management unit 122, at operation 415, in response to determining that the pattern of data repeats across the plurality of portions, stores a representation of the pattern of data in a mapping table and, at operation 420, the memory management unit 122 discards the block of data to prevent storing the block of data on the set of memory components.

In view of the disclosure above, various examples are set forth below. It should be noted that one or more features of an example, taken in isolation or combination, should be considered within the disclosure of this application.

Example 1: a system comprising: a set of memory components of a memory sub-system; and a processing device operatively coupled to the set of memory components, the processing device being configured to perform operations comprising: receiving a request to write a block of data comprising a plurality of portions to the set of memory components; determining whether a pattern of data repeats across the plurality of portions of the block of data; in response to determining that the pattern of data repeats across the plurality of portions, storing a representation of the pattern of data in a mapping table; and discarding the block of data to prevent storing the block of data on the set of memory components.

Example 2: the system of Example 1, wherein the block of data comprises a page of data, and wherein each portion of the plurality of portions corresponds to a byte of data.

Example 3: the system of Examples 1 or 2, wherein the operations comprise: comparing an individual portion of the plurality of portions to each of a remainder of the plurality of portions; and determining that the pattern of data repeats across the plurality of portions of the block of data in response to determining that the individual portion matches each of the remainder of the plurality of portions.

Example 4: the system of any one of Examples 1-3, wherein the operations comprise generating an invalid physical address corresponding to the set of memory components in response to determining that the pattern of data repeats across the plurality of portions, a portion of the invalid physical address comprising the pattern of the data.

Example 5: the system of Example 4, wherein a size of the portion of the invalid physical address matches a size of an individual portion of the plurality of portions.

Example 6: the system of any one of Examples 1-5, wherein a total quantity of bits included in the invalid physical address exceeds an address range of the set of memory components of the memory sub-system.

Example 7: the system of any one of Examples 1-6, wherein the operations comprise: in response to determining that the pattern of data fails to repeat across the plurality of portions, storing the block of data to the set of memory components.

Example 8: the system of any one of Examples 1-7, wherein the mapping table comprises a page map.

Example 9: the system of any one of Examples 1-8, wherein the operations comprise: identifying a range of valid storage addresses corresponding to the set of memory components; and incrementing the range of valid storage addresses and combining the incremented range of valid storage addresses with the pattern of data that repeats across the plurality of portions of the block of data to generate a pattern marker.

Example 10: the system of Example 9, wherein the operations comprise: storing the pattern marker as the representation of the pattern of data in the mapping table.

Example 11: the system of any one of Examples 1-10, wherein the operations comprise: identifying a logical address associated with the received request; and associating the logical address with the pattern marker in the mapping table.

Example 12: the system of any one of Examples 1-11, wherein the operations comprise: receiving, from a host, a request to read data from a logical address; and in response to receiving the request to read the data, obtaining the pattern marker from the mapping table associated with the logical address.

Example 13: the system of Example 12, wherein the operations comprise: determining that the pattern marker corresponds to an invalid address range; and in response to determining that the pattern marker corresponds to the invalid address range, extracting the pattern of data from the pattern marker.

Example 14: the system of Example 13, wherein the operations comprise: generating a read block of data comprising a plurality of read portions each including the pattern of data extracted from the pattern marker; and providing the read block of data to the host.

Example 15: the system of Example 14 wherein the request to read data is completed without reading information from the set of memory components.

Example 16: the system of any one of Examples 1-15, wherein the operations comprise: subtracting from the pattern marker the incremented the range of valid storage addresses to extract the pattern of data.

Example 17: the system of any one of Examples 1-16 wherein the operations comprise: associating multiple entries in the mapping table each corresponding to a different logical address with a same representation of the pattern of data.

Methods and computer-readable storage medium with instructions for performing any one of the above Examples.

Figure 5:
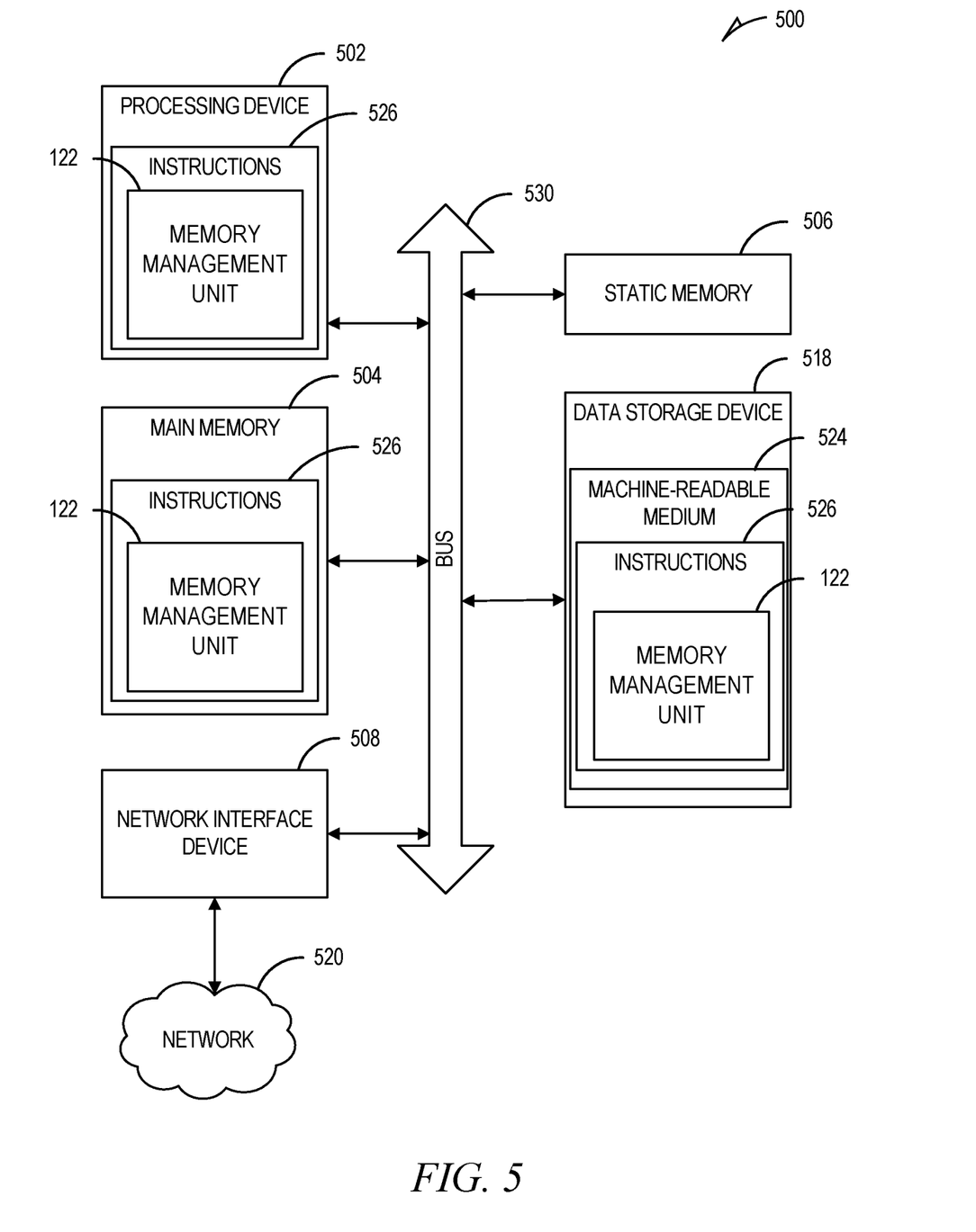
FIG. 5 is a block diagram illustrating a diagrammatic representation of a machine in the form of a computer system within which a set of instructions can be executed for causing the machine to perform any one or more of the methodologies discussed herein, in accordance with some embodiments of the present disclosure.

FIG. 5 illustrates an example machine in the form of a computer system 500 within which a set of instructions can be executed for causing the machine to perform any one or more of the methodologies discussed herein. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the memory management unit 122 of FIG. 1). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., ROM, flash memory, DRAM such as SDRAM or Rambus DRAM (RDRAM), etc.), a static memory 506 (e.g., flash memory, static random access memory (SRAM), etc.), and a data storage system 518, which communicate with each other via a bus 530.

The processing device 502 represents one or more general-purpose processing devices such as a microprocessor, a central processing unit, or the like. More particularly, the processing device 502 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 502 can also be one or more special-purpose processing devices such as an ASIC, a FPGA, a digital signal processor (DSP), a network processor, or the like. The processing device 502 is configured to execute instructions 526 for performing the operations and steps discussed herein. The computer system 500 can further include a network interface device 508 to communicate over a network 520.

The data storage system 518 can include a machine-readable storage medium 524 (also known as a computer-readable medium) on which is stored one or more sets of instructions 526, or software embodying any one or more of the methodologies or functions described herein. The instructions 526 can also reside, completely or partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 implement functionality corresponding to the memory management unit 122 (e.g., the repeating data pattern module 200) of FIG. 1. While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; ROMs; RAM); erasable programmable read-only memories (EPROMs); EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable (e.g., computer-readable) storage medium such as a ROM, RAM, magnetic disk storage media, optical storage media, flash memory components, and so forth.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a set of memory components of a memory sub-system; and
   a processing device operatively coupled to the set of memory components, the processing device being configured to perform operations comprising:
   receiving a request to write a block of data comprising a plurality of portions to the set of memory components, each portion of the plurality of portions corresponds to one or more bytes of data;
   determining whether a pattern of data within the block of data repeats across the plurality of portions of the block of data;
   in response to determining that the pattern of data within the block of data repeats across the plurality of portions of the block of data:

storing a representation of the pattern of data in a mapping table; and discarding the block of data to prevent storing the block of data on the set of memory components; and in response to determining that the pattern of data fails to repeat across the plurality of portions, storing the block of data to the set of memory components.

2. The system of claim 1, wherein the block of data comprises a page of data.

3. The system of claim 1, wherein the operations comprise:

comparing an individual portion of the plurality of portions to each of a remainder of the plurality of portions; and determining that the pattern of data repeats across the plurality of portions of the block of data in response to determining that the individual portion matches each of the remainder of the plurality of portions.

4. The system of claim 1, wherein the operations comprise:

generating an invalid physical address corresponding to the set of memory components in response to determining that the pattern of data repeats across the plurality of portions, a portion of the invalid physical address comprising the pattern of the data.

5. The system of claim 4, wherein a size of the portion of the invalid physical address matches a size of an individual portion of the plurality of portions.

6. The system of claim 4, wherein a total quantity of bits included in the invalid physical address exceeds an address range of the set of memory components of the memory sub-system.

7. The system of claim 1, wherein the mapping table comprises a page map.

8. The system of claim 1, wherein the operations comprise:

identifying a range of valid storage addresses corresponding to the set of memory components; and incrementing the range of valid storage addresses and combining the incremented range of valid storage addresses with the pattern of data that repeats across the plurality of portions of the block of data to generate a pattern marker.

9. The system of claim 8, wherein the operations comprise:

storing the pattern marker as the representation of the pattern of data in the mapping table.

10. The system of claim 8, wherein the operations comprise:

identifying a logical address associated with the received request; and associating the logical address with the pattern marker in the mapping table.

11. The system of claim 8, wherein the operations comprise:

receiving, from a host, a request to read data from a logical address; and in response to receiving the request to read the data, obtaining the pattern marker from the mapping table associated with the logical address.

12. The system of claim 11, wherein the operations comprise:

determining that the pattern marker corresponds to an invalid address range; and in response to determining that the pattern marker corresponds to the invalid address range, extracting the pattern of data from the pattern marker.

13. The system of claim 12, wherein the operations comprise:

generating a read block of data comprising a plurality of read portions each including the pattern of data extracted from the pattern marker; and providing the read block of data to the host.

14. The system of claim 13, wherein the request to read data is completed without reading information from the set of memory components.

15. The system of claim 12, wherein the operations comprise:

subtracting from the pattern marker the incremented the range of valid storage addresses to extract the pattern of data.

16. The system of claim 1, wherein the operations comprise:

associating multiple entries in the mapping table each corresponding to a different logical address with a same representation of the pattern of data.

17. A method comprising:

receiving a request to write a block of data comprising a plurality of portions to the set of memory components, each portion of the plurality of portions corresponds to one or more bytes of data;

determining whether a pattern of data within the block of data repeats across the plurality of portions of the block of data;

in response to determining that the pattern of data within the block of data repeats across the plurality of portions of the block of data:

storing a representation of the pattern of data in a mapping table; and discarding the block of data to prevent storing the block of data on the set of memory components; and in response to determining that the pattern of data fails to repeat across the plurality of portions, storing the block of data to the set of memory components.

18. The method of claim 17, wherein the block of data comprises a page of data.

19. A non-transitory computer-readable storage medium comprising instructions that, when executed by a processing device, cause the processing device to perform operations comprising:

receiving a request to write a block of data comprising a plurality of portions to the set of memory components, each portion of the plurality of portions corresponds to one or more bytes of data;

determining whether a pattern of data within the block of data repeats across the plurality of portions of the block of data;

in response to determining that the pattern of data within the block of data repeats across the plurality of portions of the block of data:

storing a representation of the pattern of data in a mapping table; and discarding the block of data to prevent storing the block of data on the set of memory components; and in response to determining that the pattern of data fails to repeat across the plurality of portions, storing the block of data to the set of memory components.

20. The non-transitory computer-readable storage medium of claim 19, wherein the block of data comprises a page of data.

* * * * *